3,358,005
POLYURETHANES AND POLYUREAS FROM DIISOCYANATES
John D. Garber, Allendale, and David Wasserman, Springfield, N.J., and Robert Allen Gasser, McGaheysville, Va., assignors to Merck & Co., Inc., Rahway, N.J., a corporation of New Jersey
No Drawing. Filed Nov. 24, 1964, Ser. No. 413,652
4 Claims. (Cl. 260—404.5)

This is a continuation-in-part of U.S. application Ser. No. 285,888 filed June 6, 1963, now U.S. Patent No. 3,281,378, which itself is a continuation-in-part of U.S. application Ser. No. 73,483, filed Dec. 5, 1960, now abandoned.

This invention relates to novel compositions of matter and to methods for producing them. In one of its more specific aspects the invention is directed to novel derivatives of the diisocyanates within the generic formula:

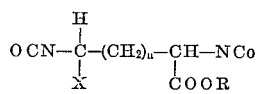

wherein X is selected from the group consisting of hydrogen and —$COOR_1$; $R_1$ is an alkyl radical of at least 4 and of 4–20 carbon atoms; when X is —$COOR_1$, R is an alkyl radical of at least 4 and of 4–20 carbon atoms and when X is hydrogen, R is an alkyl radical of at least 8 and of 8–20 carbon atoms; $n$ is selected from the group consisting of 2 and 3.

The novel derivatives of this invention are (1) isocyanate terminated and polyurethane derivatives of said diisocyanates which are produced by reacting said diisocyanates with polyols characterized by containing at least 3 carbon atoms per hydroxy group therein; (2) polyureas produced by reacting said diisocyanates with diamines within generic formula A:

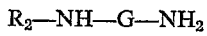

wherein $R_2$ is an alkyl or a straight chain ethylenically unsaturated hydrocarbon radical of at least 6 carbon atoms and a maximum of 20 carbon atoms; and G is $(CH_2)_m$; $m$ is at least 2; and the sum of the carbon atoms in $R_2$ and G is 14–28; (3) polyurea-polyurethane copolymers produced by reacting said diisocyanates with a mixture of said polyols and said diamines.

All of said novel derivatives of this invention are characterized by having at 25° C. a mineral spirits tolerance of at least 50% which means and shall mean throughout the present description and claims that when 10 cc. of said derivatives is placed in a beaker that substantially complete solution thereof will occur and be maintained upon the addition thereto and stirring therein of mineral spirits in amount of at least 10 cc. as evidenced by the production of a sparkling clear solution substantially free of solid particles of said derivatives. Said mineral spirits used has a boiling range of 161°–197° C. and has a Kauri-Butanol value of 39 and is available on the market as "Varsol 1."

We have discovered that our novel derivatives of said diisocyanates exhibited significant and appreciable solubility in aliphatic hydrocarbons. Because such hydrocarbons, in general, are relatively cheap, solutions of said novel derivatives therein is an important advantageous consideration especially in fields of use where price is a critical factor for commercial acceptance. In addition, because of the solubility characteristic in natural waxes, normally solid polyolefins and rubber, both synthetic and natural, this is a very important advantage in providing novel compositions of matter modified by said derivatives which may be produced in situ. The diisocyanates within formula I are soluble in mineral spirits and in such solutions may be reacted with such other reactants employed herein to provide novel derivatives thereof which are soluble in the mineral spirits used. This is especially valuable in those instances where low viscosity liquids are essential for penetration or thin film application on a substrate which can then be reacted to form solid fortified films. Wax impregnations and coatings are illustrative examples of the foregoing. Also the novel derivatives of this invention are soluble in normally liquid hydrocarbon oils and also in solid or semi-solid monomeric and polymeric hydrocarbons in amounts which vary depending upon the derivative and the hydrocarbon employed. They may be combined with petroleum oil and other mineral oils and with normally liquid fractions thereof to thicken them only slightly to solidification, thereby to increase their viscosities to the desired degree for motor oil, grease and solid fuel purposes; they may be combined with semi-solid fractions of said oils with the waxy and other normally solid fractions thereof to increase their stiffness; they may be combined with normally solid polyolefins, such as polymers of ethylene, propylene, butylene and styrene to decrease and thereby improve their low temperature brittle points; they may be combined with normally solid homopolymers of butadiene and copolymers of butadiene and styrene to act as plasticizers therefor; they may be combined with mineral oil extenders to form gels and compositions in the nature of gels which are combined with the normally solid homopolymers of butadiene and copolymers of butadiene and styrene and in the milling of such combinations, they keep the mineral oil extenders from dripping off of the mill and also act as cosolvents for those extenders and said homopolymers and copolymers whereby uniform milled products including said extenders are achieved and they also prevent the bleeding out of the extenders while acting as plasticizers.

The diisocyanates within generic Formula I are prepared by esterifying in the presence of p-toluene sulfonic acid catalyst, ornithine and lysine with an alcohol R—OH and 2,5-diamino adipic acid and 2,6-diamino pimelic acid with an alcohol $R_1OH$, R and $R_1$ being as before described. The esters are then separated from the remainder of the reaction mass as p-toluene sulfonates thereof which are converted into their free bases by running solutions of the salts thru a strongly basic anion exchange resin, such as Dowex 1–X2 which is a strongly basic anion exchange resin having a styrene-divinyl benzene polymer matrix and containing quaternary ammonium groups. It has an average particle size in the range of 50–100 mesh. The eluate is acidified with HCl gas and concentrated in vacuo and the ester-dihydrochloride is then precipitated out, washed, dried and phosgenated in a medium, such as o-dichlorobenzene after which the o-dichlorobenzene is stripped off under vacuum and the reaction mass is subjected to vacuum distillation and fraction cuts of the diisocyanates produced are recovered. Said disocyanates employed as reactants herein and the methods for producing them are described in our copending patent application 285,888, filed June 6, 1963 now U.S. Patent No. 3,281,378 and is hereby made part hereof. Also made part hereof is the entire description in copending U.S. patent application filed of even date herewith and bearing the Ser. No. 413,599, which also discloses said diisocyanates and methods for producing them.

The term polyols used in the present description and claims are those organic compounds having at least two hydroxy groups per molecule and contain no other functional group which will react at a significant rate with said diisocyanates at 25° C. Examples of said polyols are hydroxy terminated polyesters, hydroxy terminated polyethers and various glyceryl esters and other aliphatic alcohols whose number of carbon atoms is at least 3 times the number of hydroxy groups therein.

Specific examples of some of the said polyols are hydroxy terminated polyesters which may be derived from such mtaerials as the so called "Dimer Acids" available on the market. Such so called "Dimer Acids" are produced by polymerizing unsaturated fatty acids at midmolecule and are dibasic acids of high molecular weight and of relatively long alkyl chains between their carboxyl groups. Said "Dimer Acids" are known as "Empol Dimer Acids" and also as "Emery 3889–R Dimer Acids" described in Technical Bulletin No. 418B of Emery Industries Inc. Organic Chemicals Division, November 1961 and Data Sheet No. 2 of Feb. 22, 1963, Research Department of Emery Industries Inc. Also the methods for producing hydroxy terminated polyesters are disclosed in Bulletin No. 27 of Aug. 16, 1961, Development and Service Department of Emery Industries Inc. Other polyols are polybutylene glycol etc. and the various long chain glyceryl esters such as glyceryl monostearate etc.

Examples of said diamines are those diamines which are available on the market as "Duomeens" which are N-hydrocarbon subsituted trimethyl diamines. They are within the generic formula $R_3$—NH—$(CH_2)_3$—$NH_2$ with $R_3$ being the hydrocarbon moiety of coconut, soya, oleic and tallow fatty acids. The following are some of the specific hydroxy terminated polyesters which have been employed as reactants in the production of some of the novel derivatives of this invention.

*Polyesterification of "Emery 3389–R Dimer Acid" with diethylene glycol*

Fifty eight and four-tenths grams (eq. wt. 382) of "Emery 3389–R Dimer Acid," 53.0 diethylene glycol grams (eq. wt. 53) and 0.11 gram of paratoluene sulfonic acid were heated to and maintained at 195° C. for 4½ hours. 5 ml. of water was collected and excess diethylene glycol was stripped off under vacuum whereby there was obtained an approximtaely 90% yield of the resultant hydroxy terminated polyester, known as Reactant I, having a viscosity at 25° C. of 2500 centipoises, an acid number 2.0 and OH equivalent weight of 685.

*Polyesterification of "Emery 3389–R Dimer Acid" with ethylene glycol*

One hundred forty-six grams (eq. wt. 292) of "Emery 3389–R Dimer Acid," 310 grams (eq. wt. 31) ethylene glycol and 1.5 grams of paratoluene sulfonic acid while under nitrogen were heated together to and maintained at 175° C. for 2 hours and 9.6 grams of distillate were collected. This distillate had an index of refraction at 25° C. of 1.3410 indicating 91% water. Corrected water of reaction equalled 8.75 grams (97.1% of theory). The mass was cooled to 100° C. and brought under vacuum ($H_2O$ aspirator), the mass separated into two layers. The upper layer was removed therefrom and the excess ethylene glycol was stripped therefrom under a high vacuum thereby 169.5 grams (89.2% of theoretical) of the resultant hydroxy terminated dimer acid, hereinafter known as Reactant II was recovered. This Reactant II at 25° C. had a viscosity of 1550 centipoises, an acid number of 1.40 and an OH equivalent weight of 425.

*Polyesterification of "Empol 1022" Dimer Acid with 1,2-propylene glycol*

One hundred forty-eight and two-tenths grams (eq. wt. 296.5) of "Empol 1022," 380 grams (eq. wt. 38.0) 1,2-propylene glycol and 0.4 gram of paratoluene sulfonic acid were refluxed at 170° C. and 25.8 grams of a distillate were collected in a D. & S. trap, 13.7 grams of which was water. The reaction mass was cooled and then was subjected to vacuum distribution at 150° C. and 0.1 mm. of mercury pressure to strip off unreacted glycol whereby there was recovered 1786 grams (87% of theoretical) of the resultant hydroxy terminated polyester hereinafter known as Reactant III having a viscosity of 25° C. of 1132 centipoises, an acid number of 0.43 and an OH eq. wt. of 349.

The OH equivalent weights were determined by pyridine-acetic anhydride method 40 minutes reflux. The viscosities were measured by use of #3 spindle at 60 r.p.m.

An object of the invention is to provide novel derivatives of diisocyanates, which derivatives have good mineral spirits tolerance.

Another object of the invention is to provide novel isocyanate terminated derivatives and polyurethane derivatives of certain diisocyanates.

Another object of the invention is to provide novel polyurea derivatives of certain diisocyanates.

Another object of the invention is to provide novel polyurea-polyurethane copolymers.

Another object of this invention is a novel method for producing novel isocyanate terminated adducts and also novel polyurethanes having good mineral spirits tolerance values.

Another object of this invention is a novel method for producing novel polyurea-polyurethane copolymers.

These as well as other objects of the invention will be apparent from the following description.

According to one of the aspects of this invention said diisocyanates are reacted with said polyols in such proportion that the NCO/OH ratio in the reactants is such that isocyanate terminated derivatives or polyurethane derivatives are produced. In general the amount of diisocyanate to the amount of polyol is such that the NCO/OH ratio in said reactants is in the range of about 1–6 depending upon the derivative desired. When polyurethane derivatives are desired, the NCO/OH ratio in the reactants is about 1 and when the isocyanate derivatives are desired said ratio is greater than 1 and is preferably at least 1.3 and may be as high as 6.

The following are specific examples given by way of illustration and not limitation of some of the novel derivatives of this invention:

*Example 1.—Preparation of isocyanate terminated adduct produced by reacting lysine diisocyanate octyl ester with Reactant I*

Eight and sixty-five one-hundredths grams (OH eq. wt. 685; eq. wt. calc. 336) of Reactant I and 7.7 grams (eq. wt. 155) of lysine diisocyanate octyl ester were charged into an Erlenmeyer flask. The NCO/OH ratio in said reactants is about 4:1. While in said flask said reactants were mixed together and, while under a nitrogen blanket, were heated to and maintained at 120° C. for 27 hours whereupon the percent of NCO was reduced to 6.82%. The resultant mass containing an isocyanate terminated reaction product known as Product 1 had a viscosity at 25° C. of 81,000 centipoises and had a mineral spirits tolerance of 71 ml. of mineral spirits per 29 ml. of said Product 1.

*Example 2.—Preparation of isocyanate terminated adduct produced by reacting lysine diisocyanate octyl ester with Reactant I*

Ten and one-quarter grams (OH eq. wt. 685) of Reactant I and 4.65 grams lysine diisocyanate octyl ester were charged into an Erlenmeyer flask. The NCO/OH ratio in said reactants is 2:1. These reactants were heated together therein at 80° C. for 2½ hours whereupon the percent NCO was reduced to 4.37 indicating substantially complete reaction. The reaction mass hereinafter known as Product 2 consisted essentially of the resultant isocyanate terminated reaction product of the polyester. It is a clear, thick, yellow adduct having a viscosity at 25° C. of 15,000 centipoises and having a high mineral spirits tolerance characteristic as evidenced by 22 ml. thereof being soluble in 78 ml. of mineral spirits.

*Example 3.—Preparation of isocyanate terminated adduct produced by reacting lysine diisocyanate octyl ester with castor oil*

24.8 grams lysine diisocyanate methyl ester and 27.4 grams castor oil (NCO/OH 2:1) were heated together at 80° C. for 2 hours whereupon its percent NCO value was 6.38, calc. 6.43. The mass had viscosity at 25° C. of 17,500 centipoises, was a clear, pale, yellow free flowing liquid adduct, known as Product 3. 45 ml. thereof tolerated 55 ml. mineral spirits.

*Example 4.—Preparation of isocyanate terminated adduct produced by reacting lysine diisocyanate octyl ester with glyceryl monostearate*

Thirty-one grams lysine diisocyanate octyl ester and 17.92 grams glyceryl monostearate (NCO/OH ratio in reactants 2:1) were mixed together and heated to and maintained at 80° C. for 4½ hours whereby the percent NCO in the reaction mass measured 8.40 indicating completion of reaction which as calculated in 8.58. The resultant mass known as Product 4 consisting essentially of isocyanate terminated adduct had a high mineral spirits tolerance as evidenced by 5 ml. thereof tolerated 95 ml. of said mineral spirits. Said Product 4 is further characterized by being a clear, colorless, free flowing liquid at 50° C.

*Example 5.—Preparation of isocyanate terminated adduct produced by reacting lysine diisocyanate octyl ester with polybutylene glycol*

Fifteen and one-half grams of lysine diisocyanate octyl ester and 25.0 grams of polybutylene glycol were charged into an Erlenmeyer flask. The polybutylene glycol employed is available on the market as "Polyglycol B1000" having an average molecular weight of 1000. The NCO/OH ratio in said reactants is 2/1. Into said mass was added 0.15 grams dibutyl tin dilaurate catalyst whereupon reaction occurred. At the end of one hour in a room at 25° C., the resultant reaction mass known as Product 5, consisted essentially of isocyanate terminated adduct as evidenced by the percent NCO therein being 4.88, and while its calculated percent NCO was 5.2. Said Product 5 had a viscosity of 25° C. of 4,450 centipoises and 6 ml. thereof tolerated 94 ml. of said mineral spirits.

*Example 6.—Preparation of isocyanate terminated adduct produced by reacting lysine diisocyanate octyl ester with Reactant II*

Fifteen and one-half grams of lysine diisocyanate octyl ester and 21.25 grams of Reactant II were mixed until homogeneous, the NCO/OH ratio in said Reactant was 2:1. The homogeneous mass was heated to and maintained at 80° C. for 125 minutes for substantially complete reaction as evidenced by percent NCO therein being 5.63, calculated 5.72. The resultant reaction mass, known as Product 6 consisting essentially of isocyanate adduct, had a viscosity of 25° C. of 11,900 centipoises and 10.4 ml. thereof tolerated 89.6 ml. of mineral spirits.

*Example 7.—Preparation of isocyanate terminated adduct produced by reacting lysine diisocyanate octyl ester with glyceryl monostearate*

Thirty-one grams of lysine diisocyanate octyl ester and 26.88 grams of glyceryl monostearate were mixed together. The NCO/OH ratio in said reactants was 1.33:1. The mixture was heated to and maintained at 80° C. for 4 hours whereupon substantially complete reaction occurred as evidenced by percent NCO therein being 3.93, calculated 3.63. The reaction mass known as Product 7 consisting essentially of said adduct had a high mineral spirits tolerance as evidenced by 4 ml. thereof tolerating 96 ml. of said mineral spirits.

*Example 8.—Preparation of polyurethane produced by reacting lysine diisocyanate with polybutylene glycol*

Fifty grams of polybutylene glycol "B1000" of the type identified in Example 5, and 15.5 grams of lysine diisocyanate octyl ester, NCO/OH ratio in said reactants being 1:1. This mixture was heated to and maintained at 80° C. for 5 hours at the end of which time had a percent NCO at 4.46. The mass was cooled and then 0.5 grams dibutyl tin dilaurate were added thereto. The mass was heated for five minutes at 70° C. Then the liquid mass went to a very thick semi-solid in exothermic reaction to 75° C. The mass was heated at 70° C. for one hour thereafter. Complete reaction had occurred as evidenced by the percent NCO in said mass, hereinafter known as Product 8 was found to be 0. A 50% solution of Product 8 in "Cellosolve" acetate solvent had a viscosity of 25° C. of 87,000 centipoises. Also, 29 ml. of Product 8 tolerated 71 ml. of said mineral spirits.

*Example 9.—Preparation of polyurethane produced by reacting lysine diisocyanate octyl ester with glyceryl monostearate*

Seven and three-quarter grams of lysine diisocyanate octyl ester and 8.95 grams of glyceryl monostearate were mixed together and heated to and maintained at 120° C. for two hours whereupon the reaction mass, known as Product 9 and consisting essentially of polyurethane, was produced. It was a white solid at 25° C. and when heated above 60° C. was in the form of a clear, colorless liquid. A 50% solution thereof in "Cellosolve" acetate at 25° C. had a viscosity of 450 centipoises. This Product 9 had a high mineral spirits tolerance as evidenced by 4 ml. thereof tolerating 96 ml. of said mineral spirits.

*Example 10.—Preparation of polyurea produced by reacting lysine diisocyanate octyl ester with N-Coconut trimethylene diamine*

Eight grams of "Duomeen C" coconut based N-alkyl trimethylene diamine (more fully described in bulletin of Armour Industrial Chemical Company, Chicago, Ill., entitled "Duomeens," copyright in 1958 Armour & Company) were dissolved in 10 ml. of said mineral spirits.

A second solution was made up by dissolving 7.75 grams of lysine diisocyanate octyl ester in 10 ml. of said mineral spirits. The latter solution was added rapidly with stirring to said first above described solution whereupon at room temperature (25° C.) exothermic reaction occurred and continued. At the end of 2½ hours reaction completion had taken place resulting in a thick but still flowing liquid reaction mass whose NCO content was 0. The resultant reaction mass known as Product 10 had a viscosity of 25° C. of 103,000 and was further characterized in that 15 ml. thereof tolerated 85 ml. of said mineral spirits.

*Example 11.—Preparation of polyurea produced by reacting lysine diisocyanate octyl ester with "Duomeen C"*

Sixteen grams of "Duomeen C" identified in Example 10 and 7.75 grams of lysine diisocyanate octyl ester were mixed together with cooling. The NCO/OH ratio in said reaction was 0.5:1. Then they were heated to and maintained at 60° C. for fifteen minutes whereupon reaction went to completion as evidenced by percent NCO therein being 0. The resultant reaction mass, known as Product 11 had a high mineral spirits tolerance as evidenced by 2 ml. thereof tolerating 98 ml. of said mineral spirits.

*Example 12.—Preparation of polyurethane produced by reacting Product 6 with Reactant II*

Four and one-quarter grams of Reactant II were mixed with 7.46 grams of Product 6 and heated to and maintained at 75–78° for 68 hours. At the end of that time the resultant reaction mass, known as Product 12, was a polyurethane as evidence by percent NCO therein being 0. It was a viscous liquid at 25° C., and 0.973 gram thereof tolerated 1.5 ml. mineral spirits.

*Examples 13–15.—Preparation of polyurethanes produced by reacting Product 6 with Reactant II and castor oil*

The following table shows the proportion of reactants:

| | Eq. wt. | 13 | | 14 | | 15 | |
|---|---|---|---|---|---|---|---|
| | | Grams | Eqs. | Grams | Eqs. | Grams | Eqs. |
| Product 6 | 746 | 7.46 | 0.01 | 7.46 | 0.01 | 7.46 | 0.01 |
| Reactant II | 425 | 4.10 | 0.0095 | 3.83 | 0.009 | 3.40 | 0.008 |
| Castor Oil | 343 | 0.1715 | 0.0005 | 0.343 | 0.001 | 0.686 | 0.002 |

The foregoing components in the proportions above set forth were heated to and maintained at 75°–78° C. for 64 hours. At the end of that period each of said reaction masses hereafter known as Products 13, 14 and 15 had a percent NCO content of 0 indicating complete reaction and had the following mineral spirits tolerance values:

| Product | Grams | Mineral Spirits | |
|---|---|---|---|
| | | Ml. | Grams |
| 13 | 0.983 | 1.5 | 1.120 |
| 14 | 0.962 | 1.5 | 1.120 |
| 15 | 1.018 | 1.7 | 1.270 |

*Example 16.—Preparation of copolymer*

Four and one-half grams (.01 eq.) of Product 4 were dissolved in 10 ml. of methylene chloride at 0–10° C.; and 3.15 grams (0.01 eq.) of Product 11 were dissolved in 10 ml. of methylene chloride at 0–10° C. While at said temperature said solutions were mixed together and swirled for three minutes in an ice bath whereby reaction occurred and the copolymer was produced. Then the mass was heated under vacuum to strip off the methylene chloride leaving behind extremely viscous material which is a soft semi-solid and is a copolymer known as Product 16; has percent NCO 0.5 and high mineral spirits tolerance as evidenced by 3 ml. thereof tolerating 97 ml. of mineral spirits.

*Example 17.—Preparation of copolymer*

Three and fifteen one-hundredths grams (0.1 eq.) of Product 11 were dissolved in 10 ml. of methylene chloride at 0–10° C. 3.60 grams (.008 eq.) of Product 4 and 1.32 grams (.002 eq.) of Product 3 were together dissolved in methylene chloride in 15 ml. at 0–10° C. The procedure of Example 16 was followed whereby there was produced copolymer Product 17 substantially free of methylene chloride, and percent NCO value of 0, and further characterized in that 20 ml. thereof tolerated 80 ml. of mineral spirits.

*Example 18.—Preparation of copolymer*

Three and fifteen one-hundredths grams (.007 eq.) of Product 4, 1.32 grams (.002 eq.) of Product 3 and .310 grams (.001 eq.) of "Alfol 20" ($C_{20}H_{41}OH$) were together dissolved in 15 ml. of methylene chloride at 0–10° C. to form solution 1. Solution 2 fas formed by dissolving 3.15 grams (.010 eq.) Product 11 in 10 ml. of methylene chloride. While said solutions were maintained at said temperature, solution 1 was added to solution 2 and swirled for a few minutes in an ice bath then heated to evaporate off the methylene chloride under reduced pressure and then heated and maintained at 80° C. until the percent NCO therein was reduced to 0. The resultant copolymer known as Product 18 had a good mineral spirits tolerance as evidenced by 14 ml. thereof tolerating 86 ml. of said mineral spirits.

*Example 19.—Preparation of copolymer*

Employ the same procedure as that set forth in Example 18 but with the reactants being in the following proportions: 2.920 grams (.0065 eq.) Product 4, 1.645 grams (.0025 eq.) Product 3, 0.310 gram (.0010 eq.) "Alfol 20," and 3.150 grams (.010 eq.) Product 11 whereby there was produced copolymer known as Product 19 having percent NCO of 0 and further characterized in that 25 ml. therof tolerated 75 ml. of said mineral spirts.

*Example 20.—Preparation of copolymer*

Employ the same procedure and components in the amounts set forth in Example 18 except that 7.040 grams (.007 eq.) Product 7 was substituted for Product 4 therein. The resultant mass, had a percent NCO value of 0, consisting essentially of copolymer having a high mineral spirits tolerance as evidenced by 4 ml. thereof tolerating 96 ml. of said mineral spirits.

All of said mineral spirits tolerance values of the foregoing examples were measured at 25° C. unless otherwise specifically indicated and the mineral spirits employed was "Varsol 1." The dimer acid "Empol 1022" employed herein, as described in said Bulletin No. 418 B, consisted of a mixture of dimer acid (a $C_{36}$ dibasic acid—75% by weight), trimer acid (a $C_{54}$ tribasic acid—22% by weight) and 3% by weight of $C_{18}$ monobasic acid. The dimer acid "Emery 3889–R Dimer Acid" employed herein, as described in said Date Sheet No. 2 has a typical iodine value of 29 and is of light color with a typical reading of 2 on the Gardner scale, is purified dimer acid ($C_{36}$ dibasic acid—at least 95%) with most of the trimer acid ($C_{36}$ tribasic acid) and the $C_{18}$ monobasic acid having been removed.

Various other mineral spirits tolerating isocyanate terminated adducts, polyurethanes and copolymers similar to those produced by following the procedures of the aforesaid examples may be produced by substituting in said examples polyols other than used therein, as for example Reactant III and any of the other polyols and/or by employing diisocyanates of Formula I other than lysine diisocyanate octyl ester and/or by employing other diamines of Formula A.

Besides finding the uses hereinbefore set forth, the novel derivatives of the present invention are useful as adhesives, coatings and impregnants for paper, fabrics etc. By employing low viscosity diisocyanates within Formula I, polyols and/or diamines soluble in volatizable hydrocarbon solvents, the more viscous reaction products may be produced in the solvent. Consequently they may be produced either in the locus of utilization or in solution may be placed in the locus of utilization after which they may be dried or further reacted to the thick liquid or solid state. Also some of the derivatives may be cured by exposure to moisture to form polyureas in the locus of use.

Since certain changes in carrying out the above processes and certain modifications in the products which embody the invention may be made without departing from its scope, it is intended that all matter contained in the above description shall be interpreted as illustrative and not in a limiting sense.

We claim:

1. The method for producing an organic product which at 25° C. will tolerate at least an equal volume of mineral spirits which comprises reacting (A) a diisocyanate having the formula

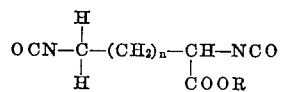

wherein R is an alkyl radical of from 8 to 20 carbon atoms and n is either 2 or 3; or (B) the reaction product of A with a polyol, said polyol being the reaction product of a polymeric, dibasic, unsaturated fatty acid with diethylene glycol, ethylene glycol, propylene glycol, or butylene glycol, said reaction being carried out at a temperature of from about 170°–195° C.; with (C) a diamine within generic formula:

$$R_2\text{---NH---G---NH}_2$$

wherein $R_2$ is selected from the group consisting of alkyl and straight chain ethylenically unsaturated hydrocarbon radicals of 6–20 carbon atoms; G is $(CH_2)_m$; m is at least 2; and the sum of the carbon atoms in $R_2$ and G is 14–28; said mineral spirits having a boiling range of 161–197° C. and Kauri-Butanol value of 39.

2. An organic reaction product which at 25° C. will tolerate at least an equal volume of mineral spirits, said mineral spirits having a boiling range of 161–197° C. and a Kauri-Butanol value of 39, which comprises the reaction product of (A) a diisocyanate having the formula

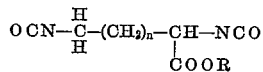

where R is an alkyl radical of from 8 to 20 carbon atoms and n is 2 or 3, with a diamine of the formula $$R_2\text{---NH---}(CH_2)_m\text{---NH}_2$$

where $R_2$ is an alkyl or an ethylenically unsaturated hydrocarbon radical of 6–20 carbon atoms, m is at least 2, and the sum of the carbon atoms in $R_2$ and $(CH_2)_m$ is 14–28;

(B) the reaction product of the diisocyanate defined above and a polyol, said polyol being the reaction product of a polymeric dibasic, unsaturated fatty acid and a lower alkylene glycol, said reaction being carried out at a temperature of from about 170°–195° C. with a diamine of the formula $$R_2\text{---NH---}(CH_2)_m\text{---NH}_2$$

where $R_2$ and m are as previously defined, or with the product obtained on reaction of said diamine with said diisocyanate; or (C) the diisocyanate defined above with glyceryl monostearate or the hydroxyl terminated polyester obtained by reaction of a polymeric, dibasic, unsaturated fatty acid with a lower alkylene glycol, at a temperature of from about 170°–195° C.

3. The product of claim 2 wherein the diisocyanate is the octyl ester of lysine diisocyanate.

4. The product of claim 2 obtained on reaction of the octyl ester of lysine diisocyanate with an N-alkyl trimethylene diamine.

References Cited
UNITED STATES PATENTS

| | | | |
|---|---|---|---|
| 2,787,601 | 4/1957 | Detrick et al. | 260—404.5 X |
| 3,102,875 | 9/1963 | Heiss | 260—404.5 X |

NICHOLAS S. RIZZO, *Primary Examiner.*

F. A. MIKA, A. H. SUTTO, *Assistant Examiners.*